(12) United States Patent
Kluko

(10) Patent No.: US 8,137,420 B2
(45) Date of Patent: Mar. 20, 2012

(54) DENSIFIED FUEL PELLETS

(75) Inventor: Milan Kluko, New Buffalo, MI (US)

(73) Assignee: Renewable Densified Fuels, LLC, Hayward, WI (US)

( * ) Notice: Subject to any disclaimer, the term of this patent is extended or adjusted under 35 U.S.C. 154(b) by 0 days.

(21) Appl. No.: 13/104,884

(22) Filed: May 10, 2011

(65) Prior Publication Data

US 2011/0306002 A1    Dec. 15, 2011

Related U.S. Application Data

(62) Division of application No. 12/070,339, filed on Feb. 15, 2008, now Pat. No. 7,960,325.

(51) Int. Cl.
*C10L 5/14* (2006.01)
*C10L 5/44* (2006.01)
*C10L 5/48* (2006.01)

(52) U.S. Cl. ............... 44/553; 44/589; 44/590; 44/605; 44/606

(58) Field of Classification Search .................. 44/508, 44/589, 590, 594–595, 605, 606
See application file for complete search history.

(56) References Cited

U.S. PATENT DOCUMENTS

| | | |
|---|---|---|
| 3,635,684 A | 1/1972 | Seymour |
| 3,852,046 A | 12/1974 | Brown |
| 3,947,255 A | 3/1976 | Hartman et al. |
| 4,015,951 A | 4/1977 | Gunnerman |
| 4,236,897 A * | 12/1980 | Johnston ............... 44/530 |
| 4,308,033 A | 12/1981 | Gunnerman |
| 4,324,561 A | 4/1982 | Dean et al. |
| 4,529,407 A | 7/1985 | Johnston et al. |
| 4,589,887 A | 5/1986 | Aunsholt |
| 4,834,777 A | 5/1989 | Endebrock |
| 4,875,905 A | 10/1989 | Somerville et al. |
| 4,952,216 A | 8/1990 | Good |
| 5,342,418 A | 8/1994 | Jesse |
| 5,376,156 A | 12/1994 | Schraufstetter et al. |
| 5,643,342 A | 7/1997 | Andrews |
| 5,755,836 A | 5/1998 | Beyer |
| 5,888,256 A | 3/1999 | Morrison |

(Continued)

FOREIGN PATENT DOCUMENTS

CA     1115955     1/1982

(Continued)

OTHER PUBLICATIONS

"AURI Fuels Initiative Agricultural Renewable Solid Fuels Data", Agricultural Utilization Research Institute, Waseca, Minnesota, available at least by Sep. 17, 2006 (4 pgs.).

(Continued)

*Primary Examiner* — Cephia D Toomer
*Assistant Examiner* — Pamela H Weiss
(74) *Attorney, Agent, or Firm* — Foley & Lardner LLP

(57) ABSTRACT

A method of producing a biomass-based fuel pellet, such as a fuel pellet which includes thermoplastic polymeric material and a substantial amount of cellulosic material, e.g. cellulosic material derived from biomass source(s), is provided. The method commonly includes compressing a feed mixture to form a densified material, where the feed mixture includes about 5 to 15 wt. % of the thermoplastic polymeric material and at least about 75 wt. % cellulosic material. Many embodiments of the fuel pellets are suitable for use in a coal-fired furnace and/or in other industrial boiler applications.

15 Claims, 4 Drawing Sheets

U.S. PATENT DOCUMENTS

| | | | |
|---|---|---|---|
| 5,916,826 A | 6/1999 | White | |
| 5,938,994 A | 8/1999 | English et al. | |
| 5,980,595 A | 11/1999 | Andrews | |
| 6,217,625 B1 | 4/2001 | McDermott et al. | |
| 6,255,368 B1 | 7/2001 | English et al. | |
| 6,322,737 B1 | 11/2001 | Beyer | |
| 6,506,223 B2 | 1/2003 | White | |
| 6,635,093 B1 | 10/2003 | Schoen et al. | |
| 6,756,114 B2 | 6/2004 | Cichocki et al. | |
| 6,818,027 B2 | 11/2004 | Murcia | |
| 7,052,640 B2 | 5/2006 | Cichocki et al. | |
| 7,241,321 B2 | 7/2007 | Murcia | |
| 2004/0045215 A1 | 3/2004 | Guilfoyle | |
| 2004/0200138 A1 | 10/2004 | Parish | |
| 2006/0228535 A1 | 10/2006 | Nie et al. | |
| 2007/0025810 A1 | 2/2007 | Huang | |
| 2008/0171297 A1 | 7/2008 | Reynolds et al. | |
| 2008/0172933 A1 | 7/2008 | Drisdelle et al. | |
| 2009/0272027 A1 | 11/2009 | Ruiters | |
| 2010/0116181 A1 | 5/2010 | Christoffel et al. | |

FOREIGN PATENT DOCUMENTS

| | | |
|---|---|---|
| WO | WO-97/05218 | 2/1997 |
| WO | WO-2008/036605 A2 | 3/2008 |
| WO | WO-2008/107042 A2 | 9/2008 |
| WO | WO-2008/106993 | 12/2008 |

OTHER PUBLICATIONS

ASTM International, Designation: D 409-02 (Reapproved 2007)3B51; 01CStandard Test Method for Grindability of Coal by the Hardgrove-Machine Method101D, Copyright © ASTM International, 100 Bar Harbor Drive, PO Box C700, West Conshohocken, PA 19428-2959, United States, available at least by Oct. 2007 (pp. 1-9).

Hardgrove R. M.1, 01CGrindability of Coal01D, Transactions of the American Society of Mechanical Engineers, vol. 54, FSP-54-5, 1932 (pp. 37-46).

Abstract of JP 57-57796 A, 01CPelletized Fuel01D, Tanaka Atsushi, publication date Apr. 7, 1982.

Abstract of JP 59-140297 A, 01CSolid Fuel Made From Waste Plastic:and Its Preparation01D, Hayahara Seiji, publication date Aug. 11, 1984.

Europaan Search Report for European Application No. 09001995.1, mail date May 13, 2009, 2 pages.

International Search Report for International Application No. PCT/US2009/032964, mail date Sep. 14, 2009, 2 pages.

* cited by examiner

DENSIFIED FUEL PELLETS

CROSS-REFERENCE TO RELATED PATENT APPLICATIONS

This application is a divisional application of U.S. patent application Ser. No. 12/070,339, entitled "DENSIFIED FUEL PELLETS," filed on Feb. 15, 2008, the disclosure of which is incorporated herein by reference in its entirety, as if the complete and entire text, and figures, had been included herein.

BACKGROUND

In the past, renewable energy sources, i.e. energy sources that can be replenished in a relatively brief time period, such as biomass or other cellulosic materials, accounted for about 90% of the energy consumed in the United States. By more recent times, however, the United States had become, and continues to be, heavily reliant on the combustion of non-renewable fossil fuels, such as coal, natural gas, and oil, to meet its growing energy needs.

Coal is the most abundant fossil fuel in the United States, and more than half of the electricity produced in the United States comes from coal-fired power-generating plants. Though coal is presently abundant in the United States and is, on an energy-per-Btu basis, currently the least expensive of the fossil fuels, it is nonetheless a non-renewable energy source and will likely become an increasingly scarce commodity over the next two centuries. Coal combustion also contributes significantly to several environmental pollutants, including heavy metals, such as arsenic and mercury, and radioactive metals, such as uranium and thorium. Furthermore, coal combustion is the source of a substantial percentage of United States emissions of sulfur dioxide, an agent implicated in the formation of acid rain.

Coal exists in a variety of grades, each with a characteristic moisture, ash, and sulfur content and an associated heat value, generally in the range of 4,000 to 15,000 Btu/lb. The grindability of a particular coal or other materials is the measure of its resistance to crushing that depends on several factors, including the moisture content, ash content, and the physical integrity of the coal. Knowing the grindability of coal is important because coal that is difficult to grind can limit the capacity of a pulverized coal-fired boiler by reducing the throughput of the coal pulverizers and because it has implications for the transportation and storage of the coal.

Biomass, a renewable energy source that contains energy stored from solar radiation, includes a wide range of organic materials produced by both animals and plants. Fuel pellets made from biomass are increasingly of commercial interest due to concerns about the finite world-wide reserves of coal and other fossil fuels, as well as the significant environmental damage resulting from coal combustion pollutants. Interest in methods of combining renewable energy sources with non-renewable waste materials that can be recycled or reused beneficially, such as waste plastics that would otherwise end up in landfills, has been driven by cost as well as environmental concerns as it becomes increasingly expensive to site, obtain operating permits for, and maintain landfills.

Previous methods of producing fuel pellets can have a variety of drawbacks, for commercial and/or industrial uses, including lower heating value and/or poor handling characteristics (e.g., a tendency to crumble), thus rendering the pellets unsuitable for many coal-fired furnaces or industrial boiler applications.

SUMMARY

The present application relates to biomass-based fuel pellets. The fuel pellets described herein typically include thermoplastic polymeric material and a substantial amount of cellulosic material, e.g. cellulosic material derived from biomass source(s), such as agricultural residues, other similar harvested organic feedstocks and/or cellulosic containing waste streams from industrial processes. Commonly, the fuel pellets comprise about 5 to 15 wt. % of thermoplastic polymeric material and at least about 75 wt. % and, more suitably, at least about 85 wt. % cellulosic material. Optionally, the fuel pellets may include a lignin additive. Many embodiments of the present fuel pellets are suitable for use in a coal-fired furnaces, biomass boilers, or other solid fuel combustion systems.

The fuel pellets of the present application may commonly be formed by compression of a feed mixture which includes cellulosic biomass and thermoplastic polymeric material. In many instances, this may be accomplished by extrusion of the feed mixture, typically at a temperature at which the thermoplastic polymeric material is in a molten state while the feed mixture is being compressed. Forming the fuel pellets may commonly involve hydraulic extrusion of the feed mixture through a fuel pellet die. The fuel pellets may also suitably be formed by uniaxial compaction of the feed mixture. During the compaction operation, the biomass/polymer feedstock mixture is typically subjected to a pressure of no more than about 2,500 psi and compaction pressures of about 1,500 to 2,000 psi are employed in many instances.

The feed mixture may commonly include about 5 to 15 wt. % thermoplastic polymeric material and at least about 75 wt. % and, often, at least about 85 wt. % cellulosic biomass material. Prior to compaction or extrusion, the feed mixture is commonly treated such that a portion of the thermoplastic polymeric material is in a molten state during compression of the mixture. This may be accomplished by application of heat from an external heating source and/or via heating of the feed mixture via the friction generated by handling of the mixture, e.g., by blending the mixture using a frictional mixing device. In some instances, a portion of the thermoplastic polymeric material may achieve a molten state by passing the feed mixture through a preheating system affixed to the thermal mixer, such that the temperature of the material entering the thermal mixer is at least about 140° C. and, often 145° C. or higher before the entering the thermal mixer. In other instances, the temperature of the thermal mixer may be raised by application of heat from an external heating source or via residual heating of the feed mixture via normal friction generated by handling of the mixture, e.g., to about 140° C. or higher, after the feed mixture has been introduced to the mixer. The thermoplastic polymeric material may infuse into the cellulosic fibers while the thermoplastic polymeric material is molten and also may subsequently harden upon cooling to form the polymeric casing. The hot fuel pellets formed via the extrusion process may be cooled using a conventional air cooling device or alternatively may be introduced into a cooling bath, e.g., a cooling bath containing glycerin. If a glycerin cooling bath is employed, the cooled fuel pellets can absorb some of the glycerol. The fuel pellets produced by these methods can have a minimum dimension of at least about 1 cm and a heat value of about 9,500 Btu/lb or higher, while retaining good grindability and handling characteristics. In other embodiments, the fuel pellets may be comminuted to form densified fuel material made up of smaller particulates. If desired the fractionated to obtain pellets of different sizes.

In some embodiments, the densified fuel pellet has a grindability which is similar to that of a particular coal which is particularly suitable as a heat source in a specific application. The grindability of a material is a measure of its resistance to crushing and can depend on a number of factors such as the physical integrity of the material, its moisture content and/or ash content. A common test for determining the grindability of coal or other related materials is the Hardgrove-machine method that produces a grindability value for coal known as the Hardgrove Grindability Index ("HGI"), or Hardgrove number (discussed in more detail below). The present densified fuel pellets may suitably have a minimum dimension of at least about 1 cm, an HGI of no more than about 80, and desirably may have an HGI of no more than about 60. The present densified fuel pellets may suitably have a pellet durability index ("PDI"; discussed in more detail below) of at least about 80, more suitably at least about 90 and in some instances 95 or higher. Such densified fuel pellets typically have a heat value of at least about 9,500 Btu/lb. The densified fuel pellets suitably include about 5 to 15 wt. % thermoplastic polymeric material and at least about 75 wt. % cellulosic material. These densified fuel pellets may be formed from a feed mixture that also includes lignin additive.

A method of generating heat in a boiler system designed for burning coal is also provided herein. The method includes combusting a fuel material which includes a plurality of the densified fuel pellets. The fuel material may include coal pieces in addition to the densified fuel pellets. Very often, it may be advantageous to use a fuel mixture which includes coal pieces and densified fuel pellets having substantially similar size and density characteristics. In some embodiments, the densified fuel pellet may have a grindability which is similar to that of the particular coal which is particularly suitable as a heat source in a specific boiler system. In some embodiments, the densified fuel pellet may be formed such that it is substantially similar in size and density to a particular coal or solid-grate fuel.

DETAILED DESCRIPTION

The present densified fuel pellets may be formed by a process which includes forming a mixture including biomass and thermoplastic polymeric material. Commonly, the mixture will include cellulosic biomass material. Suitable cellulosic biomass feedstocks may generally include plant wastes from food processing or industrial processes, such as sawdust and/or paper pulp, agricultural plant wastes, such as, cereal straws, corn stover, and sugarcane bagasse, and/or plants grown for fuel production, such as switchgrass. Other examples of suitable cellulosic biomass feedstocks include biomass residuals from sawmills and finishing plants, pulp and paper mill residuals, sawdust, wood, and other untreated lumber recovered from construction sites, as well as agricultural residues, such as corn stover and rice hulls. In some instances, the dry mass of cellulosic biomass consists of about two-thirds cellulose and hemicellulose and one-third lignin, with smaller amounts of proteins, fats, waxes, oils, and ash present. The mixture from which the present densified fuel pellet may be formed may also desirably include polymeric material. Thermoplastic polymeric materials are particularly advantageous for use in the present process because such materials may be melted and subsequently allowed to re-harden during formation of fuel pellets. Melting of the polymeric material followed by hardening may result in a pellet with superior heat values and a pellet durability index ("PDI") that facilitates transportation and handling of the pellets, and may provide a significant moisture barrier. The use of the present fuel pellets can significantly reduce and in some instances essentially eliminate fugitive dust emissions. The thermoplastic polymeric material may suitably be selected from a group comprising high or low density polyethylene, polypropylene, polyamide, polyimide or combinations thereof. Optionally, the mixture may also include lignin additive. The lignin additive may be added in a dry form or as an aqueous solution or slurry in water.

Figure 1:
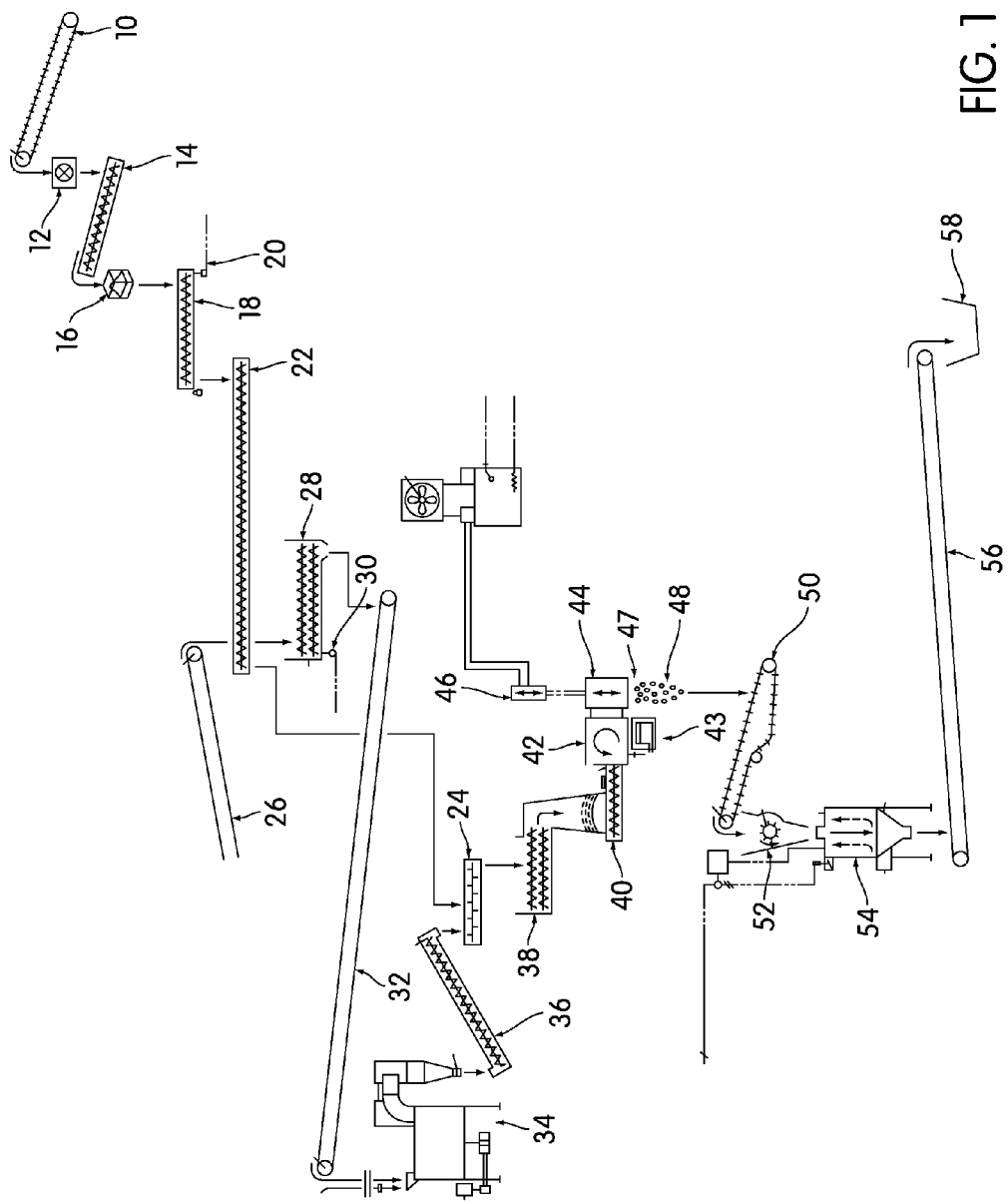
FIG. 1 depicts a schematic of an illustrative embodiment of a densified fuel production system for producing the present densified fuel pellets.

The Figures illustrate various embodiments of process which may be employed to produce the present biomass-based fuel pellets. Referring to FIG. 1, polymeric material enters the fuel pellet production assembly at a first conveyor belt 10 that transports the polymeric material to a shredder 12 for sizing. The polymeric material is commonly sized to a particular specification, and is typically in the form of a flake or bead of less than about half an inch in dimension. The shredded polymeric material is collected via a first metering screw 14 that conveys the shredded polymeric material to a hopper or storage bin 16. The storage bin 16 feeds a second metering screw 18 that measures either a predetermined volume of shredded polymeric material or a predetermined weight of shredded polymeric material via a load cell 20. The shredded polymeric material is moved through the second metering screw 18 and then through a third metering screw 22 that transports the shredded polymeric material to a mixing screw 24. The mixing screw 24 suitably has a ton per hour ("TPH") capacity of at least about 0.4 to 0.7 TPH.

Raw biomass or other cellulosic feedstock materials enter the fuel pellet production assembly at a second conveyor belt 26 that conveys the feedstock to a blending station 28 that is linked to a second load cell scale 30. The blending station 28 may suitably have a capacity of at least about 500 ft$^3$ and at least about 5 tons. The feedstock is moved through the blending station 28 to a third conveyor belt 32 that transports the feedstock to a sizer-dryer 34, where the moisture content of the feedstock is typically reduced to no more than about 15 wt. %, and preferably to no more than about 11 wt. %, and the feedstock is comminuted to a desired particle size. Commonly the desired particle size less than about one inch, desirably less than about three-quarters of an inch. Upon exiting the sizer-dryer 34, the feedstock enters a fourth metering screw 36. The fourth metering screw 36 suitably has a capacity of at least about 2 to 4 TPH (tons per hour). The fourth metering screw 36 is used to transport the feedstock to the mixing station 24 where the feedstock is mixed with the shredded polymeric material to form a combined feed stream. The combined feed stream suitably comprises at least about 85 wt. % feedstock and 5 to 15 wt. % shredded polymeric material, desirably comprises about 90 wt. % feedstock and 10 wt. % shredded polymeric material, and in some instances comprises about 95 wt. % biomass feedstock and about 5 wt. % shredded polymeric material. The combined feed stream is then commonly transported from the mixing station 24 to a surge bin 38 having a capacity of at least about 100 lb. and desirably of at least about 1,000 lb. The combined feed stream moves from the surge bin 38, through a stop/start feed conveyor 40, and into a preheating system 41 affixed to a thermal mixer 42. The preheating system 41 heats the mixed stream to about 140 to 150° C. as it enters the thermal mixer 42. The specific temperature selected will depend on the type of thermoplastic polymeric material and feedstock present in the feed stream. For example, with many feedstock sources, if HDPE is employed as the thermoplastic material, the feed stream will suitably be heated to about 140 to 150° C. The mixed stream may be heated in the thermal mixer 42 by an external heat source, such as an electric heater 43, or may be heated by heat generated by friction inside the thermal mixer 42.

Figure 2:
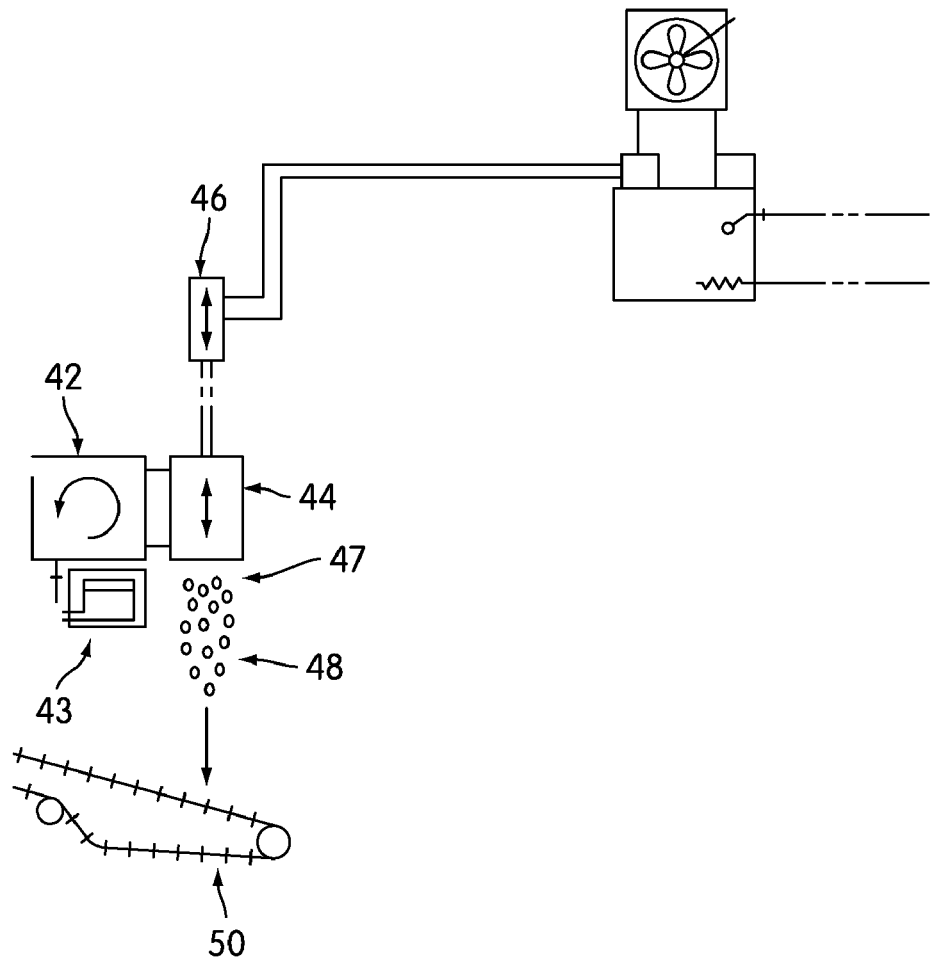
FIG. 2 is an expanded view of the thermal mixing/press portion of the system depicted in FIG. 1.

Referring to FIG. 2, the heated mixed stream moves from the thermal mixer 42 to the extruder or uniaxial compactor 44 comprising a hydraulic press unit 46, where it is densified and pelletized to form fuel pellets 48. The fuel pellets 48 exit the extruder or uniaxial compactor 44 through a tapered extrusion die 47 that typically compresses the mixed stream by a factor of at least about 2 or suitably by a factor of about 3 to 5 or even higher. The fuel pellets are transferred from the extruder or uniaxial compactor 44 to a fourth conveyor belt 50. Referring to FIG. 1, the fourth conveyor belt 50 transports the fuel pellets 48 to a pellet breaker 52. The fuel pellets 48 pass through the pellet breaker 52 into a counterflow air pellet cooler 54. The counterflow air pellet cooler 54 may typically have a capacity of at least about 50 ft$^3$. The fuel pellets 48 will suitably be retained in the counterflow air pellet cooler 54 for at least about ten minutes or suitably for at least about 5 minutes before being transferred to a fifth conveyor belt 56 that deposits the cooled fuel pellets in a storage or distribution location 58. A system such as the one described above can typically be capable of production of about 3 to 4 TPH of the densified fuel pellets.

The fuel pellet of the present application commonly has a minimum dimension of at least about 1 cm, and may desirably have a minimum dimension of at least about 1.5 cm. The fuel pellet may have a grindability similar to that of soft coal, e.g., may suitably have a Hardgrove Grindability Index ("HGI"; see discussion below) of no more than about 80, and desirably may have an HGI of no more than about 60. In some embodiments, the fuel pellet may suitably have a sulfur content of no more than about 0.5 wt. %. In some embodiments, the fuel pellet may have an ash content of no more than about 8 wt. %, desirably no more than about 5 wt. %., and more desirably no more than about 2 wt. %. The fuel pellet may typically have a specific gravity of about 1 to 1.2 g/cm$^3$, and may suitably have a specific gravity of about 1.05 to 1.15 g/cm3. In some embodiments, the extruded densified fuel pellet may have a density of about 20 to 45 lb/ft$^3$. In other embodiments, the extruded densified fuel pellet may suitably have a density of at least about 20 lb/ft$^3$ and suitably about 25 to 35 lb/ft$^3$. In some embodiments, the ratio of the specific gravity of the biomass and thermoplastic polymeric material mixture before pelletization to the specific gravity of the fuel pellet following pelletization may be about 1.5 or higher. Typically, the fuel pellet may have a heating output of at least about 9,500 Btu/lb and may suitably have a heating output of at least about 10,000 Btu/lb.

In some embodiments, the densified fuel pellet may be formed by a method that comprises extruding a mixture to form a densified fuel pellet, wherein the mixture will commonly include polymeric material. Typically, the polymeric material will be molten at least during formation of the densified fuel pellet. Thermoplastic polymeric materials are particularly advantageous for use in the present mixture because they may melt and subsequently harden during or after formation of the fuel pellet which may result in a pellet with superior heat values and PDI that facilitates in-tact transportation of the pellet. Selection of a suitable thermoplastic polymer must take into account that the melting point of the polymer must be below a temperature that could result in combustion of the biomass. The thermoplastic polymeric material may be selected from a group comprising high or low density polyethylene, polypropylene, polyamide, polyimide or combinations thereof. Suitably, the thermoplastic polymeric material will comprise polyethylene, polypropylene, or a mixture thereof. Commonly the thermoplastic material will include recycled thermoplastic material. In some embodiments, the thermoplastic polymeric material has a melting point of about 130 to 150° C. In some embodiments, the thermoplastic polymeric material suitably has a melting point of about 140 to 150° C.

In some embodiments, the densified fuel pellet may be formed by a method that comprises extruding a mixture to form a densified material, wherein the mixture may commonly include biomass or other harvested organic materials, such as agricultural residues. The dry mass of cellulosic biomass typically consists of about two-thirds cellulose and hemicellulose, and one-third lignin, with smaller amounts of proteins, fats, waxes, oils, and ash present. In some embodiments, the mixture will also include about 0.5 to 5 wt. % lignin additive (dry basis) or suitably about 1 to 3 wt. % lignin additive (dry basis) where the lignin is in the form of an aqueous solution or slurry. Lignin is particularly advantageous for use in the present mixture because lignin is a residual resource and renewable resource. A further advantage of lignin is that the carbon dioxide gas produced by the combustion of lignin is offset by the carbon dioxide absorbed by the lignin as it grows, thus resulting in no net greenhouse gas production. Lignin also may act as a binder in fuel pellet and may result in a fuel pellet with desirable physical properties and improved combustion.

In some embodiments, the cellulosic material has an initial moisture content of no more than about 15 wt. % or suitably no more than about 10 wt. %. Cellulosic biomass feedstocks may generally include production wastes or residuals from industrial processes, such as sawdust, pulp mill rejects, agricultural plant wastes, such as, cereal straws, corn stover, and sugarcane bagasse, as well as plants grown for fuel production, such as switchgrass. Typically, the mixture biomass will comprise a cellulosic material. Suitably, the cellulosic material will comprise at least about 75 wt. % of the mixture and may desirably comprise at least about 90 wt. % of the mixture. In some embodiments, the cellulosic material may be in particulate form having a maximum dimension of no more than about 3 mm.

In some embodiments, the densified fuel pellet may be formed by a method that comprises extruding a mixture to form a densified fuel pellet, wherein the densified fuel pellet may have a minimum dimension of at least about 1 cm. In other embodiments, the densified fuel pellet may be formed by a method that comprises uniaxial compaction of a mixture to form a densified fuel pellet, wherein the densified fuel pellet may have a minimum dimension of at least about 1 cm and may desirably have a minimum dimension of at least about 1.5 cm. A fuel pellet may commonly have a diameter of at least about 1.5 cm and a length of at least about 2 cm. In some embodiments, the densified fuel pellet may have a moisture content of no more than about 3 wt. % or suitably no more than about 5 wt. %. In some embodiments, the densified fuel pellet may have a sulfur content of no more than about 0.5 wt.

% or suitably no more than about 0.3 wt. %. The densified fuel pellet may commonly have an ash content of no more than about 8 wt. %, suitably no more than about 5 wt. % and more suitably no more than about 2 wt. %.

In some embodiments, the fuel pellet is capable of producing a heating output of about 9,500 Btu/lb. In some embodiments, the densified fuel pellet may suitably have a specific gravity of about 1 to 1.2 g/cm$^3$, or desirably or about 1.05 to 1.15 g/cm$^3$. In some embodiments, the densified fuel pellet may commonly have a density of about 20 to 45 lb/ft$^3$, or suitably or about 25 to 35 lb/ft$^3$. In some embodiments, the ratio of the specific gravity of the mixture before extrusion to the specific gravity of the fuel pellet may be no more than about 0.7.

In various places in this application, the grindability of the present densified fuel pellets is discussed. A common test for determining the grindability of coal and related materials is the Hardgrove-machine method ASTM D409-02(2007)e. In the Hardgrove test, the grindability of an unknown sample material is assessed relative to a standard coal sample assigned a grindability of 100. The resulting value of the Hardgrove test is the Hardgrove Grindability Index ("HGI"), or Hardgrove number. The lower the HGI, the more difficult it is to grind a sample as compared to the standard. The present densified fuel pellets may have an HGI of no more than about 80. In some embodiments, the densified fuel pellet may suitably have an HGI of no more than about 70, or desirably between about 50 and 60.

Alternatively, in various places in this application, the PDI of the present densified fuel pellets is discussed. A densified fuel pellet with a relatively low PDI will tend to lose its ability to stay together. Thus, the present densified fuel pellets desirably have a PDI of at least about 80 and more desirably 90 or higher. The PDI of the present fuel pellets is a measure of their physical integrity and can be determined using the procedure as described below.
 1. Obtain a representative sample of the finished pellet, e.g., from the pellet cooler discharge area.
 2. Screen the cooled pellet sample on a U.S. No. 7 sieve screen and then obtain a 100 gram sample of the cooled, screened pellet product.
 3. Place the 100 gram sample in a pellet tumbler testing canister containing five ½" hex nuts.
 4. Tumble the pellet sample for 5 minutes.
 5. Screen the tumbled sample on a U.S. No. 7 sieve to separate the fines and reweigh the pellet sample.
 6. Document the weight of pellet sample remaining (as a percentage of the original pellet sample) to determine the PDI.

EXAMPLES

The following examples are presented to illustrate the methods of producing the fuel pellets described herein, and to assist one of ordinary skill in making and using the same. The examples are not intended in any way to otherwise limit the scope of the invention.

Example 1

Figure 3:
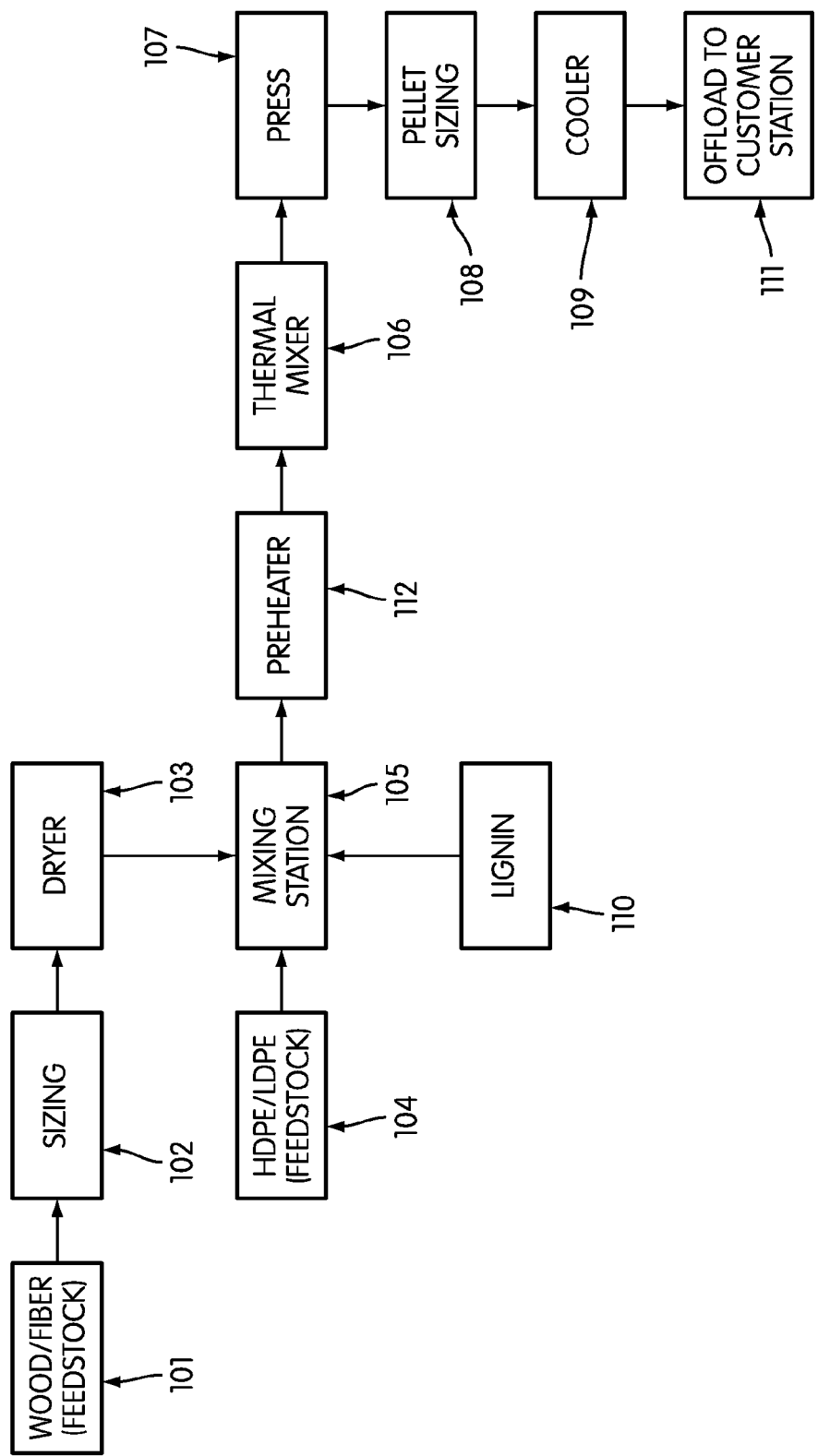
FIG. 3 depicts a schematic illustration of another exemplary embodiment of a system for producing the present densified fuel pellets.

FIG. 3 shows a schematic illustration of one embodiment of a method of producing the present densified fuel pellets. As illustrated in FIG. 3, a wood/fiber/cellulosic feedstock 101 such as biomass residuals from sawmills and finishing plants, pulp and paper mill residuals, sawdust, wood, and other untreated lumber obtained from construction sites, can be treated in a sizing device 102 to produce particulate material having a particle size no larger than about 3 to 4 mm. The wood/fiber/cellulosic particulate may then be dried 103 to produce a cellulosic feedstock having a moisture content of about 10 to 12 wt. %. About 890 lbs/hour of the dried cellulosic feedstock is introduced into the mixing station 105 together with about 90 lbs/hour of high density polyethylene (HDPE) and/or low density polyethylene (LDPE) from polymer feedstock bin 104. Each of these feedstock materials may be introduced into mixing station 105 with the aid of a screw auger. At the same time, about 20 lbs/hour of a dry lignin additive are also introduced into mixing station 105 from lignin source 110. The blended feed mixture is then transferred to preheating system 112 where the blended feed/polymer mixture is heated to a temperature of about 140° to 150° C. The blended feed mixture is then transferred to thermal mixer 106 where the feed mixture is further blended and heated by residual frictional heating and, commonly, heat supplied from an external heat source, e.g., an electric heater, to a temperature of about 140° C. to 150° C. After the feed mixture is blended in the thermal mixer 106 for a time period sufficient for substantially all of the HDPE/LDPE to be melted and complete mixing, the feed mixture is transferred, e.g., via auger, to press 107 where the mixture with the HDPE/LDPE still in a substantially molten state is compressed sufficiently to increase the specific gravity of the fuel mixture by a factor of at least about four. The compressed fuel mixture exiting the press 107 is comminuted into pieces of a desired size in pellet sizer 108, e.g., columnar ribbons of compressed fuel material with a diameter of about 1.5 cm may be chopped into cylindrical pieces about 2.5 to 3 cm in length. The temperature of the fuel pellets is lowered by passage through cooler 109, e.g., by blowing cooler air over the comminuted material, before being transferred into appropriate packaging, such as bags or bins at the offload to customer station 111. The resulting fuel pellets can have a density of about 20 to 35 lb/ft$^3$ and heat value of at least about 9,500 Btu/lb. Densified fuel pellets of this type may have a pellet durability index ("PDI") of at least about 80.

Example 2

As illustrated in FIG. 3, a wood/fiber feedstock 101 such as biomass residuals from sawmills and finishing plants, pulp and paper mill residuals, sawdust, wood, and other untreated lumber obtained from construction sites, as well as agricultural residues, such as corn stover and rice hulls, can be treated in a sizing device 102 to produce particulate material having a mesh size of about ¾" to ¼". Alternately, if the wood/fiber feedstock is already sized and dry, it may be introduced directly into mixing station 105. The wood/fiber particulate may then be dried 103 to produce a cellulosic feedstock having a moisture content of about 10 to 12 wt. %. About 900 lbs/hour of dried cellulosic feedstock is introduced into mixing station 105 together with about 100 lbs/hour of polypropylene (PP) from polymer feedstock bin 104. Each of these feedstock materials is commonly introduced into mixing station 105 with the aid of a screw auger. The blended feed mixture is then transferred into preheating system 112 where the blended feed mixture is heated to a temperature of about 140° to 150° C. (circa 275° to 290° F.). The heated blended feed mixture is then transferred to thermal mixer 106 where the feed mixture is further blended and maintained at about 140° to 150° C. After the feed mixture is blended in the thermal mixer 106 for a time period sufficient for substantially all of the polypropylene to be mixed with other feedstocks, the feed mixture is transferred, e.g., via auger, to press 107 where the mixture with the polypropylene still in a substantially molten state is extruded as cylindrical ribbons of compressed material with a diameter of about 1.5 cm. The cylindrical ribbons of compressed fuel mixture exiting the press 107 is comminuted into pieces of a desired length in pellet sizer 108, e.g., the compressed fuel material may be chopped into cylindrical pieces about 1 to 3 cm in length. The temperature of the fuel pellets is then lowered by passage through cooler 109, e.g., by blowing cooler air over the comminuted material, before being transferred into appropriate packaging, such as bags or bins at the offload to customer station 111. The resulting fuel pellets can have a density of about 30 to 35 lb/ft$^3$ and heat value of at least about 9,500 Btu/lb. Densified fuel pellets of this type may have a pellet durability index ("PDI") of at least about 80.

Example 3

Figure 4:
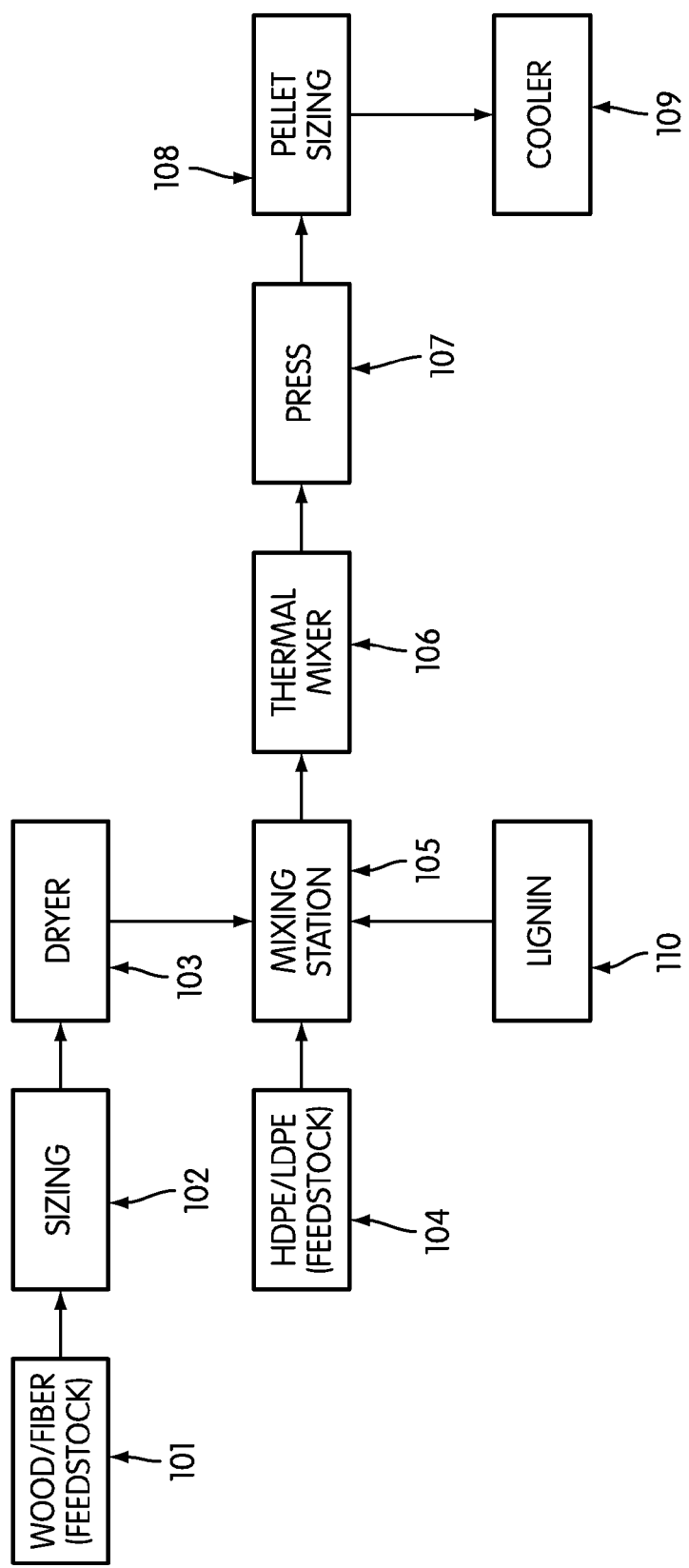
FIG. 4 depicts a schematic illustration of another exemplary embodiment of a system for producing the present densified fuel pellets.

Using a process similar to that described in Examples 1 and 2, a wood/fiber feedstock containing a mixture of biomass residuals from sawmills and finishing plants and/or pulp and paper mill residuals (circa 30 to 35 wt. % of the biomass feedstock) and mixed hardwoods waste (e.g., sawdust, wood chips and/or other comminuted, recovered untreated hardwood stock; circa 65 to 70 wt. % of the biomass feedstock), can be treated in a sizing device to produce a cellulosic particulate feedstock having a particle size of no more than about ¼" to ¾" (no more than about 5 to 20 mm). Alternately, if the wood/fiber feedstock is already sized and dry, it may be introduced directly into mixing station. The wood/fiber particulate may then be dried to produce a cellulosic feedstock having a moisture content of about 10 to 12 wt. %. About 910 lbs/hour of the dried cellulosic feedstock is introduced into mixing station together with about 80 lbs/hour of an HDPE/LDPE mixture from polymer feedstock bin. The polymer feedstock may include about 20 to 30 wt. % HDPE and about 70 to 80 wt. % HDPE. Each of these feedstock materials is commonly introduced into mixing station with the aid of a screw auger. Optionally, about 5 to 10 lbs/hour of dried lignin material may also be introduced into the mixing station. The blended feed mixture is then transferred into a thermal mixer which has been preheated to a temperature of about 140° to 150° C. (circa 275° to 290° F.). The heated blended feed mixture is then blended in the thermal mixer for a time period sufficient for substantially all of the polymer to be mixed with the biomass feedstock (typically circa 5 to 20 seconds). The feed/polymer mixture is transferred, e.g., via auger, to a hydraulic press where the mixture with the polymer still in a substantially molten state is extruded as cylindrical ribbons of compressed material with a diameter of about 1.5 to 2 cm. The biomass feedstock/molten polymer mixture may be extruded using a hydraulic ram under a pressure of about 1,500 to 2,000 psi (suitably about 1,600 to 1,800 psi). The cylindrical ribbons of compressed fuel mixture exiting the press is comminuted into pieces of a desired length, e.g., the compressed fuel material may be chopped into cylindrical pieces about 1 to 3 cm in length. The temperature of the fuel pellets is then lowered by passage through a counterflow air pellet cooler, e.g., by blowing cooler air over the comminuted material, before being transferred into appropriate packaging, such as bags or bins. The process described in this Example may suitably be carried out using a densified fuel production system such as illustrated in FIG. 4. The resulting fuel pellets can have a density of about 25 to 35 lb/ft$^3$ and heat value of at least about 9,500 Btu/lb. Densified fuel pellets of this type may have a pellet durability index ("PDI") of at least about 80 and, more desirably at least about 90.

It will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values are provided for embodiments, additional embodiments are described by taking any 2 different values as the endpoints of a range. Such ranges are also within the scope of the described invention

What is claimed is:

1. A method of producing a densified fuel pellet comprising:
    compressing a feed mixture to form a densified material, wherein the mixture includes:
        a) about 5 to 15 wt. % molten thermoplastic polymeric material; and
        b) at least about 75 wt. % cellulosic feedstock material; such that the densified material has a minimum dimension of at least about 1 cm and a heat value of at least about 9,500 Btu/lb (as is basis).

2. The method of claim 1 wherein the cellulosic feedstock has a moisture content of no more than about 15 wt. % and is in particulate form having a maximum dimension of no more than about 20 mm.

3. The method of claim 1 further comprising, prior to the compressing step, blending the feed mixture in a mixer for a time period sufficient for substantially all of the thermoplastic polymeric material to be melted.

4. The method of claim 1 further comprising:
    preblending comminuted thermoplastic polymeric material and comminuted cellulosic feedstock material in a mixing station to provide a preblended feed mixture;
    transferring the preblended feed mixture into a preheating system where the preblended feed mixture is heated to a temperature of at least about 140° C.

5. The method of claim 1 further comprising blending the feed mixture in a heated mixer for a time period sufficient for substantially all of the thermoplastic polymeric material to be melted.

6. The method of claim 1 wherein the feed mixture is maintained at a temperature of at least about 140° C. during the compressing step.

7. The method of claim 6 wherein the thermoplastic polymeric material comprises high density polyethylene, low density polyethylene or a mixture thereof.

8. The method of claim 1 wherein the feed mixture is compressed sufficiently to increase the specific gravity of the feed mixture by a factor of at least about three.

9. The method of claim 1 wherein the densified material is extruded as columnar ribbons of compressed material; and further comprising comminuting the compressed material into pieces; and blowing air over the comminuted material to provide cooled comminuted pieces of the compressed material.

10. The method of claim 1 wherein the feed mixture is subjected to a compaction pressure of 1,500 to 2,500 psi during the compression step.

11. The method of claim 1 wherein the densified fuel pellet has a sulfur content of no more than about 0.5 wt. % and an ash content of no more than about 2 wt. %.

12. The method of claim 1 wherein a batch of the densified fuel pellets has a bulk density of about 25 to 35 lb/ft$^3$.

13. The method of claim 1 wherein the thermoplastic polymeric material comprises polyethylene, polypropylene, or a mixture thereof.

14. The method of claim 1 wherein the thermoplastic polymeric material comprises a mixture of high density polyethylene and low density polyethylene.

15. The method of claim 1 wherein the method produces a densified fuel pellet having a pellet durability index of at least about 90 and a bulk density of about 25 to 35 lb/ft$^3$.

* * * * *